United States Patent Office 3,489,779
Patented Jan. 13, 1970

3,489,779
PURIFICATION OF NEO-CARBOXYLIC ACIDS BY TREATING WITH SULFURIC ACID AND A PHASE-SEPARATING AGENT
Roby Bearden, Jr., Baton Rouge, La., assignor to Esso Research and Engineering Company, a corporation of Delaware
No Drawing. Filed Dec. 23, 1965, Ser. No. 516,087
Int. Cl. C07c *51/48, 53/22*
U.S. Cl. 260—419       5 Claims

ABSTRACT OF THE DISCLOSURE $C_5$–$C_{30}$ neo-acids contaminated with olefinic impurities are purified by contacting a crude neo-acid mixture with concentrated sulfuric acid to form a homogeneous solution. The acid treated crude neo-acid mixture is then contacted with either (a) a paraffinic hydrocarbon, or (b) a controlled amount of water in order to effect the separation of the neo-acids from the olefinic impurities.

---

This invention is directed to the refinement (purification) of neo acids by removal of close boiling olefinic impurities, which greatly devaluate the economic value of the product neo acids by developing objectionable coloration therein, esp., on exposure of said neo acids to air and/ or sunlight. The term "neo acids" as used herein refers to branched chain $C_5$ to $C_{30}$ carboxylic acids produced from olefins, e.g., by the Koch synthesis. These acids can be visualized as having the representative formula:

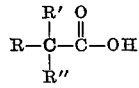

where R, R' and R'' are the same or different alkyl groups.

The neo acid purification process of this invention is conducted in essentially two stages. In the first stage, the raw product neo acid containing unreacted olefin trace metal(s) principally iron and oxygenated by-products as impurities is contacted with concentrated sulfuric acid containing at least 85+ wt. percent $H_2SO_4$. Usually the sulfuric acid strength is 90+% and more preferably 95+%. This acid contact renders the neo acids(s) and olefinic and other impurities mutually soluble in a homogeneous solution. In the second stage of the process of this invention, the homogeneous neo acid-impurities solution is contacted with a phase separation agent capable of effecting phase separation of the neo acid and olefinic impurities. By rendering the neo acid and olefinic and other impurities mutually soluble in a homogeneous sulfuric acid phase, a more complete separation of impurities is rendered possible during the second stage treatment (phase separation). This is the case because far better contact of impurities with sulfuric acid results in more complete reaction of impurities to form materials, viz, sulfates, capable of separating from neo acid in the second stage.

It should be noted here that both of the above-mentioned stages are essential to the attainment of the advantageous results secured by this invention. If one attempts to conduct the second stage without first performing the first stage, the purification desired is not secured.

More specifically, the present invention is directed to a process for removal of close boiling olefin and other color forming impurities from $C_5$ to $C_{30}$ neo acids by essentially a two-stage process comprising: (A) contacting said neo acids containing said impurities with concentrated sulfuric acid containing 85+ wt. percent $H_2SO_4$ and then either ($B_1$) adding a paraffinic hydrocarbon to cause phase separation by extraction between said neo acid and said sulfuric acid soluble impurities wherein the neo acid(s) are soluble in and therefore present in paraffin phase whereas said olefinic and other impurities previously converted to sulfates in stage (A) are soluble in and therefore present in the sulfuric acid phase; or ($B_2$) adding a sufficient amount of water to liberate the neo acid(s) from its sulfuric acid complex but without hydrolyzing said impurities, viz, adding sufficient amounts of water to spring the neo acids(s) but insufficient amounts of water to hydrolyze the alkyl sulfates and other impurities formed during step (A).

If alternative ($B_1$) is employed, sufficient sulfuric acid is used in step (A) to cause and enhance the occurrence of phase separation in the second stage of the purification process by overcoming the common solubility effects of sulfuric acid and neo acid. Usually, this requires greater than approximately 10 wt. percent sulfuric acid to be employed in step (A), based on the amount of neo acid present. More usually, greater than about 30 wt. percent $H_2SO_4$, based on the amount of neo acid present, is employed.

If the second stage of purification is conducted in accordance with procedure ($B_2$) indicated hereinabove, considerable lesser amounts of sulfuric acid can be, and usually are, used in step (A) thus resulting in economic savings because the process (A plus $B_2$) does not depend upon paraffinic phase separation to occur in order to secure purification of the neo acid product. Instead, the process (A plus $B_2$) achieves separation of the neo acid from said impurities by addition of water to cause a sulfuric acid phase separation wherein the said impurities separate out with the $H_2SO_4$-aqueous phase. In such a case, the impurities are rendered soluble in the sulfuric acid-aqueous phase whereas the neo acid, having a lower specific gravity, will be separated therefrom without the need for any paraffinic hydrocarbon being employed. If too much water is used in stage ($B_2$) the said organic impurities will be hydrolyzed and rendered soluble in the neo acid layer. If this occurs, the advantageous separation previously obtained by the addition of water will be lost. Hence it should be clearly understood that a sufficient amount of water is employed in stage ($B_2$) to liberate the neo acid from its sulfuric acid complex, but insufficient amounts to hydrolyze the sulfated organic impurities referrred to hereinabove.

As noted hereinabove, both the first and second stages are essential because if one attempts to conduct either stage without the other the purification will not be obtained. For example, if the paraffin treatment is tried alone as a purification process, the neo acid is not purified from the olefinic and other color-forming impurities because these impurities are just as soluble in the paraffin as the neo acid. On the other hand, if one were to attempt water addition alone as a purification process, the neo acids are not purified because neither the neo acids nor the olefins nor the color forming impurities are soluble in water.

Not only are both stages essential to obtain the results secured by this invention, but also the indicated sequence of treatment is critical. That is to say that the sulfuric acid treatment using 85+ wt. percent $H_2SO_4$ must be conducted prior to either of the above noted second stage treatments. If one attempts to conduct the paraffin treatment ($B_1$) before the concentrated sulfuric acid treatment step (A), unacceptable purification results, because the impurities are still homogeneous phase (solution) with the neo acid. The subsequent $H_2SO_4$ treatment fails to readily form the extractable sulfates with the impurities. Long contacting periods at elevated temperatures and using expensive contacting equipment are required to secure separation of impurities from neo acid which separation is inferior to that obtained by the practice of this invention. The reason for this criticality appears to reside in the fact that very poor contact and reaction occurs between the olefinic and other impurities and sulfuric acid in the presence of significant amounts of paraffin.

On the other hand, if one attempts to conduct the secondary stage procedure by controlled addition of water ($B_2$) before the sulfuric acid treatment step (A), the sulfuric acid strength is lowered to the extent that sulfation of impurities (formation of impurity sulfates) cannot occur satisfactorily because the diluted sulfuric acid and the neo acid are not mutually soluble. Since the impurities are carried with the neo acid in such a situation, poor contact and reaction is secured due to the fact that the diluted sulfuric acid and the neo acid are not mutually soluble. Hence, there is a greatly reduced ability to form the extractable sulfates from the olefinic and other impurities.

Regardless which of the secondary stage procedures ($B_1$) or ($B_2$) is employed, excellent neo acid purification is secured. Each procedure has certain advantages which will be apparent from the description which follows. If second stage procedure ($B_1$) is to be used, at least about 20 wt. percent of 85+$H_2SO_4$ is employed based upon the amount of neo acid present at the oneset of the purification process in stage (A). Usually from 35 to 45 wt. percent $H_2SO_4$, based on the amount of neo acid present, is used, and according to a preferred embodiment of this invention, excellent purifications are obtained in the process (A plus $B_1$) when approximately 40 wt. percent sulfuric acid based on the amount of neo acid present is employed in stage (A). The contact of the neo acid reaction product containing the olefin and other impurities with the sulfuric acid can be achieved at temperatures ranging from 0 to 100° F. Usually, ambient temperatures of about 60 to 80° F. are employed at atmospheric pressure conditions. As noted above, the sulfuric acid treatment causes a formation of the homogeneous mixture containing the neo acid, and the sulfuric acid, and the alkyl sulfates formed from the olefins, alcohols and other impurities. Of course the metals present, for example iron, readily form the metal sulfates.

During the paraffin extraction step ($B_1$) from 50 to 300 wt. percent paraffin based on the total weight of the sulfuric acid and raw neo acid product is employed. Usually from 75 to 100 wt. percent paraffin is used. The paraffins suitable for use in accordance with the second stage process ($B_1$) of this invention include $C_5$ to $C_{12}$ paraffins. Suitable exemplary paraffins which can be employed in accordance with this invention include, but are not limited to, the following: pentane, hexane, heptane, cyclohexane, octane, decane, dodecane and isomers and mixtures thereof.

During this paraffin extraction step, the neo acid separates as an upper phase because the neo acid is soluble in paraffin. On the other hand, the sulfates are soluble in the lower sulfuric acid phase. Hence, a highly efficient phase separation of the neo acid from its impurities is secured. The upper paraffin and neo acid layer usually contains about 5 to 10 wt. percent sulfuric acid which can be removed by a conventional water wash. After removal of the sulfuric acid has been accomplished, the paraffin is flash distilled from the neo acid generally using operating distillation temperatures of 96° F. to 420° F. Of course, the exact glass distillation conditions depend upon the composition of the paraffinic solvents or solvent mixture being used in the secondary stage of the purification process. The lower sulfuric acid phase contains the alkyl sulfates, other impurities, and 10 to 15 wt. percent of neo acid. The neo acid can be removed therefrom, if desired, by the addition of water. However, this is not always necessary, and it is preferred that the sulfuric acid be recycled directly to the initial stage without removal of the neo acid or alkyl sulfates so long as the concentration of the latter built up by recycling to stage (A) is not so high as to exhaust the acids capacity for sulfation of impurities.

When proceeding in accordance with secondary stage ($B_2$), viz., phase separation secured by careful addition of sufficient amounts of water to spring the neo acid from its complex, but insufficient amounts to hydrolyze the olefin sulfates and other sulfate impurities; considerably lesser amounts of sulfuric acid based on the amount of neo acid present, can be employed in stage (A) of the process. However, the same operating temperatures and pressures are employed in stage (A) regardless of which secondary stage is to be used. As noted in the discussion above, an homogeneous mixture of sulfuric acid, neo acid, and olefinic sulfate and other sulfate impurities formed during step (A) is achieved therein. The process (A plus second stage $B_2$) differs from the process (A plus second stage $B_1$) in that the ($B_2$) procedure achieves phase separation by means of a sulfuric acid phase separation induced by a dilution of fact by gradual addition of trace amounts of water as the ($B_1$) procedure induces phase separation by extraction of neo acid with paraffinic solvents.

The ($B_2$) procedure should be conducted carefully to insure that sufficient amount of water is employed to liberate the neo acid from its sulfuric acid complex, but without hydrolyzing the said impurities. Therefore, the water should be added gradually and in comparatively small amounts. The actual amount used will depend on the sulfuric acid strength employed in step A. Usually, from 2 to 6 wt. percent based on sulfuric acid will suffice to cause phase separation if 96+ wt. percent sulfuric acid is employed. Proportionally smaller amounts of water are needed for less concentrated sulfuric acid. It has been found helpful in achieving the proper phase separation effect by the addition of water to add a paraffin solvent, such as any of those mentioned hereinabove in conjunction with the ($B_1$) procedure, after the sulfuric treatment but prior to the addition of water. It should be understood that the phase separation secured is still a sulfuric acid phase separation triggered by the addition of water. The amount of paraffin added is not critical and can range from about 20 to 100 wt. percent paraffin based on total weight of sulfuric acid and neo acid plus impurities. When the paraffin is employed in stage ($B_2$) to enhance the sulfuric acid phase separation, caused by the gradual addition of trace amounts of water, usually from 40 to 60 wt. percent of paraffin solvent is employed based on the total weight of sulfuric acid, sulfates, and neo acids. As stressed above, when the paraffin is employed as an intermediate conditioning treatment prior to the addition of water in the secondary stage ($B_2$) the phase separation secured is a sulfuric acid phase separation which is water triggered. Therefore, as noted above with respect to ($B_2$) considerably less sulfuric acid, e.g., usually less than 10 wt. percent $H_2SO_4$ based on the amount of neo acid present, is still used because significant paraffin phase separation need not be conducted.

The neo acid phase separates as an upper phase containing trace amounts of sulfuric acid along with any paraffin which may have been employed subsequent to the water addition. Any trace amounts of sulfuric acid present can be removed from this upper neo acid phase by washing with water. The neo acid can then be flash distilled to remove any paraffin which may be present (if employed). Of course, if no paraffin is employed in stage ($B_2$), the neo acid is taken off in pure form as a decanted or otherwise separated upper phase.

The sulfuric acid and alkyl sulfates separate as a lower phase. This phase contains diluted sulfuric acid, usually having an $H_2SO_4$ concentration of less than 85 wt. percent based on the total of $H_2SO_4$ plus water. This dilute sulfuric acid layer is then usually discarded. The reason for this is that this material is not of sufficiently high concentration to be employed in stage (A) of the process. If it were sought to be recycled, it could not be recycled directly and would have to be dewatered to a sufficient extent as to contain 85+ wt. percent sulfuric acid in order for it to be suitable for use in stage (A) of the process.

The invention will be illustrated in greater detail by the examples which follow. Parts and percents specified herein are by weight unless otherwise indicated.

EXAMPLE 1

A mixture of isomeric neo decanoic acids (commercial product) prepared from $C_9$ UOP olefins via the Koch reaction was found to exhibit poor color stability, primarily as a result of contamination by close boiling olefins. Trace metals, chiefly iron (50–100 p.p.m.), were also found present.

An attempt to remove these impurities and improve color stability by fractional distillation proved ineffectual. Although virtual elimination of the metal contamination was achieved the olefin impurity was found to boil within the boiling range of the $C_{10}$ neo acid mixture, i.e., 266–278° F. (7 mm.) and could not be removed. Color stability of neo acid mixture (measured by Acid Crea color) was not improved.

| Neo Decanoic Acid | Gardner Color [1] | Acid Crea No.[2] | Iodine No.[3] |
|---|---|---|---|
| Untreated commercial product | 9 | 2+ | 2.5 |
| Distilled product | 6 | 2+ | 2.2 |
| Target specification | <2 | <1.0 | <1.0 |

[1] Undiluted acid samples rated against the 0–16 Gardner color scale.
[2] Sample darkening by concentrated $H_2SO_4$ absolute centimeters at 470 mμ. Found to predict color stability. Maximum Crea value=2.
[3] Measure of unsaturation. Expressed as gms. iodine/100 g. sample.

EXAMPLE 2

The untreated acid mixture of Example 1, 100 parts, was diluted with 150 parts (by wt.) of n-heptane and stirred with 50 parts of 96% sulfuric acid for 30 minutes at ambient temperature (77° F.). The hydrocarbon layer was then separated and washed with water to remove traces of sulfuric acid. Heptane was removed by flash distillation; maximum pot temperature was 266° F. at 150 mm. A simple one-plate distillation of the residue gave 95 parts of the neo decanoic acids B.P. 263–268° F. (7 mm.), which analyzed as follows:

| | Gardner Color | Acid Crea No. | Iodine No. |
|---|---|---|---|
| Neo Decanoic Sample: | | | |
| Untreated | 9 | 2+ | 2.5 |
| Acid washed | 10 | 2+ | 2.3 |
| Target specification | <2 | <1.0 | <1.0 |

As will be noted from the above data, essentially no removal of impurities occurs if the paraffin is added prior to sulfuric acid contact.

EXAMPLE 3

The untreated neo acid of Example 1, 100 parts, was treated with 70 parts of concentrated (96%) sulfuric acid at ambient temperature (77° F.). There resulted a homogeneous solution of deep red coloration and an accompanying rise in temperature from 77° F. to 110° F. After 30 minutes time the solution was extracted twice with fresh n-heptane (100 parts used for each extraction). The combined extracts were then water-washed free of sulfuric acid, and the neo acids were recovered according to the procedure described in Example 2. The purified product, 85 parts, gave the following analyses.

| Neo Decanoic Acid Sample | Gardner Color | Acid Crea No. | Iodine No. |
|---|---|---|---|
| Untreated | 9 | 2+ | 2.5 |
| $H_2SO_4$ paraffin treated | 1 | 0.178 | 0.4 |
| Target specification | <2 | <1.0 | <1.0 |

The advantageous removal of color forming impurities by practice of this invention is clearly apparent.

EXAMPLE 4

The sulfuric acid residue, 80 parts, from the hydrocarbon extraction in Example 3 was recycled to purify three additional 100-part samples of the neo decanoic acid mixture. The acid treating procedure used was exactly that described in Example 3 and the purified neo acids were isolated according to procedure given in Example 2. Analyses for the neo acid products (table below) attest to the feasibility of using recycle sulfuric acid.

NEO DECANOIC ACID PURIFICATION SULFURIC ACID RECYCLE STUDIES

| | | Product Analyses | | |
|---|---|---|---|---|
| | Sulfuric acid | Gardner Color | Acid Crea No. | Iodine No. |
| Extraction: | | | | |
| 1 (Example 3) | Fresh | 1.0 | 0.178 | 0.4 |
| 2 | From Ext. 1 | 2.0 | 0.442 | 0.4 |
| 3 | From Ext. 2 | 1.5 | 0.325 | 0.6 |
| 4 | From Ext. 3 | 1.0 | 0.145 | 0.7 |

EXAMPLE 5

The untreated acid of Example 1, 95 parts, was mixed with 5 parts of concentrated (96%) sulfuric acid and allowed to stand at ambient temperature for 30 minutes. The deep red homogeneous solution was then diluted with 100 parts (by wt.) of n-heptane and treated with 1 part of water. Upon addition of the water (vigorous stirring employed) a phase separation took place wherein the red coloration was carried into a bottom sulfuric acid phase. The hydrocarbon phase, now essentially colorless, was washed free of sulfuric acid. Recovery of the purified neo acids according to procedure described in Example 2 gave 92 parts of near water white product which analyzed as follows:

| Neo Decanoic Acid Sample | Gardner Color | Acid Crea No. | Iodine No. |
|---|---|---|---|
| Untreated | 9 | 2+ | 2.5 |
| $H_2SO_4$-$H_2O$ treated (Example 5) | 1 | 0.168 | 0.66 |
| Target specification | <2 | <1.00 | <1.00 |

The satisfactory results as indicated by the above data clearly establish the merit of the $H_2SO_4$ followed by water addition to remove impurities from neo acids.

EXAMPLE 6

An attempt to repeat the purification procedure described in Example 3 with 80 wt. percent sulfuric acid failed. The neo decanoic acid and 80% sulfuric were not mutually soluble and a stirred contact of the phases failed to produce the deep red coloration characteristic of olefin sulfation.

EXAMPLE 7

The purification procedure described in Example 5 was repeated with the exception that the addition of one part of water was substituted by a large volume water wash. An immediate discharge of color indicated hydrolysis of sulfation product. Analyses for the recovered neo acids (isolation according to procedure in Example 2) showed that purification had not been achieved.

| Neo Decanoic Acid Sample | Gardner Color | Acid Crea No. | Iodine No. |
|---|---|---|---|
| Untreated | 9 | 2+ | 2.5 |
| $H_2SO_4$ treat (Example 7) | 6 | 2+ | 2.0 |

What is claimed is:
1. A process for removing $C_5$ to $C_{30}$ neo-acids, having the general formula:

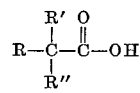

wherein R, R', and R" are alkyl groups from a raw product neo-acid containing olefinic and other impurities which comprises contacting said raw product neo-acid with 85+ wt. percent sulfuric acid to form a homogeneous solution, and then contacting said homogeneous solution with a phase separating agent wherein said agent is a $C_5$ to $C_{12}$ paraffinic hydrocarbon to separate said neo-acid from said impurities.

2. A process as in claim 1 wherein the sulfuric acid strength is 90+ wt. percent.

3. A process as in claim 1 wherein the concentration of sulfuric acid in said contacting step, based on the amount of said neo-acid present, ranges from about 20 to about 40 wt. percent.

4. A process as in claim 1 wherein the neo-acid is neo-decanoic acid.

5. A process for removing $C_5$ to $C_{30}$ neo-acids having the general formula:

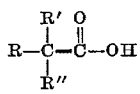

wherein R, R' and R" are alkyl groups from a raw product neo-acid containing olefinic and other impurities which comprises contacting said raw product neo-acid with 96+ wt. percent sulfuric acid to form a homogeneous solution and then contacting said homogeneous solution with a phase separating agent wherein said phase separating agent is water and the amount of water employed ranges from 2 to 6 wt. percent based on sulfuric acid.

References Cited

UNITED STATES PATENTS

| 1,740,012 | 12/1929 | Godal | 260—419 |
| 2,230,582 | 2/1941 | Beller | 260—452 |
| 2,308,431 | 1/1943 | Brandt | 260—419 |
| 2,434,699 | 1/1948 | Huff | 260—419 |
| 2,652,414 | 9/1953 | Terry et al. | 260—419 |
| 2,795,543 | 6/1957 | Opie | 260—419 |

FOREIGN PATENTS 538,646  11/1931  Germany.

OTHER REFERENCES

Morrison and Boyd—"Organic Chemistry," pp. 136–37, Allyn and Bacon, Inc., Boston, Mass., 1959.

ALEX MAZEL, Primary Examiner

R. V. RUSH, Assistant Examiner

U.S. Cl. X.R.

260—452, 526, 533, 703